March 5, 1963 T. PADEK 3,079,935
AUTOMATIC CLEANING SYSTEM
Filed March 2, 1961 4 Sheets-Sheet 1

INVENTOR.
TED PADEK
BY E. F. Bard
ATTORNEY

March 5, 1963 T. PADEK 3,079,935
AUTOMATIC CLEANING SYSTEM
Filed March 2, 1961 4 Sheets-Sheet 3

INVENTOR.
TED PADEK
BY E. F. Bard
ATTORNEY

INVENTOR.
TED PADEK
BY E. F. Bard
ATTORNEY

United States Patent Office 3,079,935
Patented Mar. 5, 1963

3,079,935
AUTOMATIC CLEANING SYSTEM
Ted Padek, 6740 E. 25th Place, Tulsa, Okla.
Filed Mar. 2, 1961, Ser. No. 92,959
6 Claims. (Cl. 134—45)

This invention relates to systems for cleaning the exterior surfaces of moving objects, and more particularly relates to systems for cleaning trucks, passenger cars, and other similar types of motor vehicles, with a minimum amount of human effort.

It is an obvious fact that automobiles and trucks, during only a normal amount of operation, accumulate considerable road soil upon their surfaces. This soil is often oily and therefore difficult to remove. When automobiles and trucks are driven over streets and highways during inclement weather this accumulation of soil is aggravated. Moreover, if the streets contain snow, the vehicles often gather such snow in masses on the inner surfaces of fenders and bumpers. It is well known that accumulations of such road soil and snow, if permitted to adhere to paint and metallic surfaces, will eventually cause serious deterioration of the vehicles. Another aspect, however, is the fact that road soil greatly reduces the attractiveness of the vehicle. Although this may constitute a mere annoyance to the owner of a private automobile, it is an operating factor of considerable significance to the owner of a fleet of commercial vehicles. Moreover, if the fleet owner happens to be a transporter or vendor of foodstuffs, and thus concerned with maintaining a favorable public impression of the cleanliness of his operations, vehicle cleaning becomes a serious matter. Thus, it is readily understandable why a dairy, notwithstanding the labor cost, will wash its trucks daily rather than risk creating an impression of anything other than impeccably clean operations.

However, as any car owner knows, the task of washing a motor vehicle is arduous and time consuming even if the best equipment is available. Thus, many expedients have, from time-to-time, been devised in an effort to either reduce the number of man-hours so expended, or to more efficiently organize the effort applied to the task. The best known innovation, in recent years, has been the so-called "quick car-wash" where an organized team of workers engage in an ant-like attack upon a slowly moving car. Although such an operation is often a convenience for an individual passenger car owner, it does not actually reduce the expenditure of man hours required to clean a vehicle, and therefore it is unsuitable for fleet owners except where time is of the essence. Various types of mechanical washers have been devised. However, in each case they have proved to be unsuitable from two standpoints; i.e., they each require the attendance of at least one person during the washing operation, and they all require a certain degree of adjustment or adaptation to accommodate vehicles of irregular dimensions.

It is well known that the use of a pressurized stream of water will greatly facilitate the task of washing the exterior surfaces of a vehicle. In order to speed up washing operations, many fleet operators have installed various types of spray apparatus which usually comprise an array of pipes and nozzles mounted on a rack consisting generally of two upright members connected with an overhead horizontal member. An ideal form of this spray apparatus is depicted in U.S. Letters Patent No. 2,965,305, issued to Morris Glazer and Ted Padek on December 20, 1960. Such an apparatus obviates the necessity for the attendant to approach the vehicle by providing a curtain of fluid through which the vehicle to be washed may be driven. Two such racks, one providing a bath of cleansing solution and the other a rinsing bath of water, are often arranged progressively so that the vehicle may be merely driven through the bath provided by the washing rack and thereafter driven through the bath provided by the rinsing rack. Such an arrangement, while superior to the employment of an attendant armed with a hose and scrubber, still requires the use of human labor. Not only must the supply of cleansing solution be kept constantly replenished, but the two baths must be alternately turned on and off, as the vehicle progresses from the wash rack to the rinse rack, in order to avoid waste.

Several attempts have been made to make a washing and rinsing system which would be "self-operating." In one such arrangement the racks are equipped with solenoid or motor-driven control valves which, in turn, are connected to actuators comprising photo-electric switches of the type commonly known as "electric eyes." These switches are arranged along the expected course of the vehicle in a manner such that the vehicle itself will activate and de-activate each rack when approaching and passing under it. Unfortunately, the efficiency of the baths depends to a considerable extent upon the force with which the streams of washing and rinsing liquids are directed at the vehicle. Thus, an effective operation creates a heavy mist in the surrounding atmosphere which, even under optimum conditions, often actuates the "eyes" without regard for the presence or absence of a vehicle.

There has been one partly successful attempt to provide a truly "self-operating" wash and rinse system, and which is now in commercial use. This improvement involves the substitution of limit switches for the aforementioned photo-electric switches. The limit switches are equipped with actuators consisting of metal consisting of slender metal rods or wands, and are generally mounted on the racks with the wands extending into the path of the vehicles. Thus, an approaching vehicle brushes against the wands to actuate the limit switches while proceeding from rack to rack. One disadvantage with the use of wand-actuated limit switches is the fact that such switches cannot be effectively shielded from the deteriorating effects of the moisture-laden atmosphere without concurrently limiting the sensitivity of the wands. Another more serious disadvantage, however, is the fact that the wands are required to be three to four feet long in order to reach vehicles of varying width and are therefore difficult to support in a horizontal position. Moreover, the wands of this length tend to whip back and forth, after the vehicle has passed, and this whipping action damages the limit switches. In order to install the system in a reasonable space it is usually necessary to mount the wand-actuated limit switches on the racks. This, then, requires a rack-to-rack spacing at least equal to the length of the longest vehicle sought to be accommodated by the system.

These disadvantages are overcome by the present invention, and novel apparatus is provided which washes and rinses a vehicle entirely without the necessity of human assistance or control except for that used in driving the vehicle, and except for that labor used in providing the system with cleaning fluid. These advantages are preferably attained by the use of two spray assemblies, as hereinbefore mentioned and hereinafter described in detail, such assemblies being connected respectively to individual supplies of cleansing fluid and rinse water by means of gating equipment such as solenoid or motor-operated valves. The gating equipment is preferably activated and de-activated by actuators interposed at pre-determined locations in the path of the vehicles in a manner such as to be energized by the weight of the vehicle as it moves over the actuators.

It is an object of the present invention, therefore, to provide a new and useful apparatus for cleaning objects moving progressively along a selected route.

It is further an object of the present invention to provide a system for washing and rinsing the top and sides of a vehicle which is activated and de-activated respectively by the approach and departure of the vehicle.

It is also an object of the present invention to provide a system for washing and rinsing the exterior of vehicles which is operated by the passage through the system of a vehicle to be washed and rinsed.

It is a specific object of the present invention to provide a system for washing and rinsing vehicles of irregular sizes and shapes moving along a selected path, said system being activated, controlled, and de-activated by the movement of said vehicles along said path.

These and other objects will become apparent from a reading of the detailed description hereinafter set forth, and from a reference to the accompanying drawings wherein.

Figure 1:
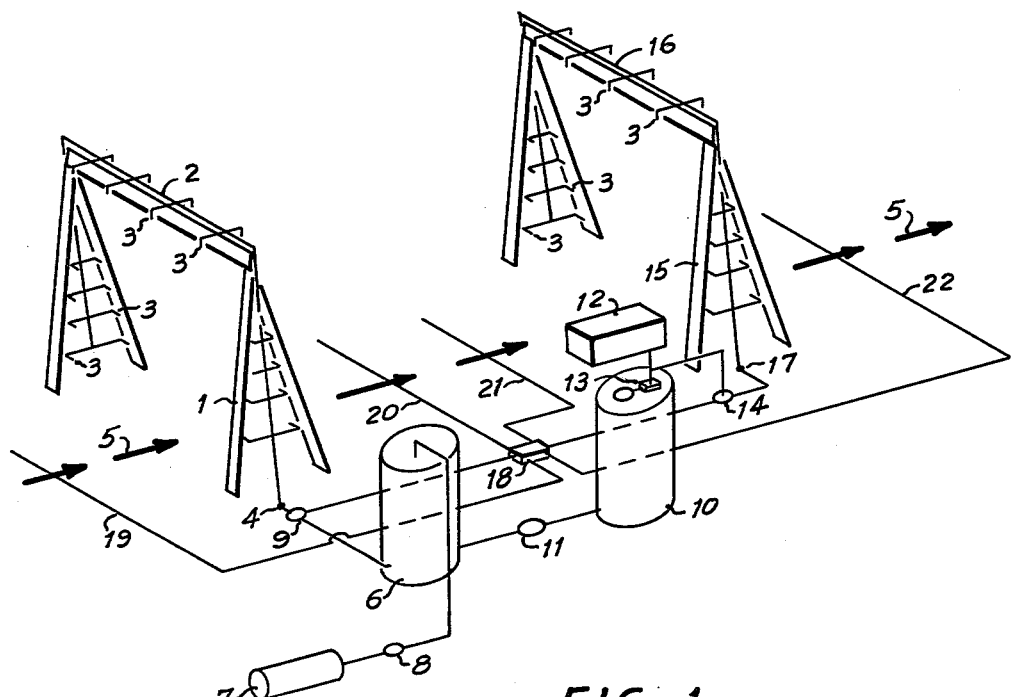
FIGURE 1 shows a pictorial view of one form of the present invention.

Referring now to FIGURE 1, there is shown a first rack 1 supporting a first spray manifold 2 composed of piping and having a series of nozzles 3 each preferably of a type which provides a fan-shaped spray when liquid is ejected therethrough. As shown, the piping composing the spray manifold 2 has a single inlet 4, and the nozzles 3 serve as outlets. The first rack 1 and first spray manifold 2 is disposed in a straddling manner across the expected path 5 of the vehicles to be washed, at a first location, and in a manner such that, when cleansing fluid is received through the inlet 4 and discharged through the nozzles 3, a curtain or bath of cleansing fluid is thereby provided in an intersecting manner across and about the path 5. Since the most efficient washing action is achieved with a combination of chemical and mechanical action, the nozzles 3 are preferably arranged so that each fan-shaped spray is directed either towards or away from the expected travel of the vehicle, rather than perpendicular to the path 5, and the cleansing fluid is preferably a solution of a quick-acting detergent or soap.

The cleansing solution is preferably retained in a first tank 6, hereinafter referred to as the pressure tank 6, before being provided to the first spray manifold 2. To achieve the mechanical action desired for efficient cleaning, it is preferable that the cleansing fluid be subjected to a driving force as it is passed to the first spray manifold 2. In that form of the present invention shown in FIGURE 1 this force is provided by a compressed air supply 7 which is connected through an air control valve 8 to the interior of the pressure tank 6. Under an air pressure of approximately 150 p.s.i., the cleansing fluid in the pressure tank 6 may be passed through a first tank control valve 9 to the inlet 4 of the first spray manifold 2. The first tank control valve 9 may for the present purposes be a solenoid controlled valve as hereinafter explained. The size of the pressure tank 6 is not significant to the concept of the present invention although it is preferable that it contain sufficient fluid for a multiple of washing cycles.

Since it is usually inconvenient to maintain large stocks of liquid detergent, the particular form of the present invention depicted in FIGURE 1 utilizes a second tank 10 wherein a solid detergent may be mixed with water to form a reservoir of cleansing fluid. This second tank 10, hereinafter referred to as the mixing tank 10, may for the purposes of the present invention be an open vat-type of container having a single outlet interconnected to the pressure tank 6 by way of a transfer pump 11. Water is preferably supplied to the mixing tank 10, through a float cutoff valve 13 mounted near the top of the mixing tank 10, from any convenient and suitable water supply 12 providing a continuous flow of water when tapped. The float cutoff valve 13 should be arranged so that its float will rise and close the valve 13 when a pre-determined amount of water has been admitted to the mixing tank 10. The size of the mixing tank 10 is not significant to the concept of the present invention, and it need be considered only when determining the amount of solid detergent to place in the mixing tank 10. The float cutoff valve 13 is preferably of a type that remains closed, once the mixing tank 10 has been filled, even though the liquid level in the mixing tank 10 drops due to a transfer of part of the contents of the mixing tank 10 to the pressure tank 6. Thus, no water will enter the mixing tank 10, to dilute the detergent concentration in the cleansing solution, until the float cutoff valve 13 is opened by the attendant to prepare a new "batch" of cleansing solution. It is worthy of comment, at this point, that the only manual steps normally required for the present invention, as shown in FIGURE 1, are the steps of depositing a pre-determined quantity of solid detergent in the mixing tank 10, releasing the float of the float cutoff valve 13 to permit the mixing tank 10 to fill with water, and thereafter to energize the transfer pump 11 to shift the contents of the mixing tank 10 to the pressure tank 6.

As further shown in FIGURE 1, a second rack 15 supporting a second spray manifold 16 is disposed in a straddling manner about the path 5 at a second location for the purpose of providing a curtain of rinse water for the vehicle after it emerges from the washing operation. The second spray manifold 16, which is substantially similar to the first spray assembly 2, has its only inlet 17 interconnected with the water supply 12 by way of a control valve 14. This control valve 14 is preferably operated by an electric motor (not shown), rather than by a solenoid, to eliminate adverse effects of a surge of water from the water supply 12. Both the solenoid controlled valve 9 and the motor controlled valve 14 are connected for control purposes to a master control box 18 having an internal circuitry as hereinafter described. Also connected to the master control box 18 are four actuators 19, 20, 21, and 22, which are disposed across the path 5. As depicted in FIGURE 1, when an approaching vehicle rolls over actuator 19 the solenoid controlled valve will open to interpose the aforementioned curtain of cleansing fluid about the path 5. When the vehicle proceeds through the curtain of cleansing fluid, and thereafter successively rolls over actuators 20, 21, and 22, in that order, the solenoid controlled valve 9 will close, the motor controlled valve 14 will open, and thereafter the motor controlled valve 14 will again close. Thus, when properly prepared, the entire system is operable without direct attendance by any human except the person driving the vehicle to be cleaned.

Figure 2:
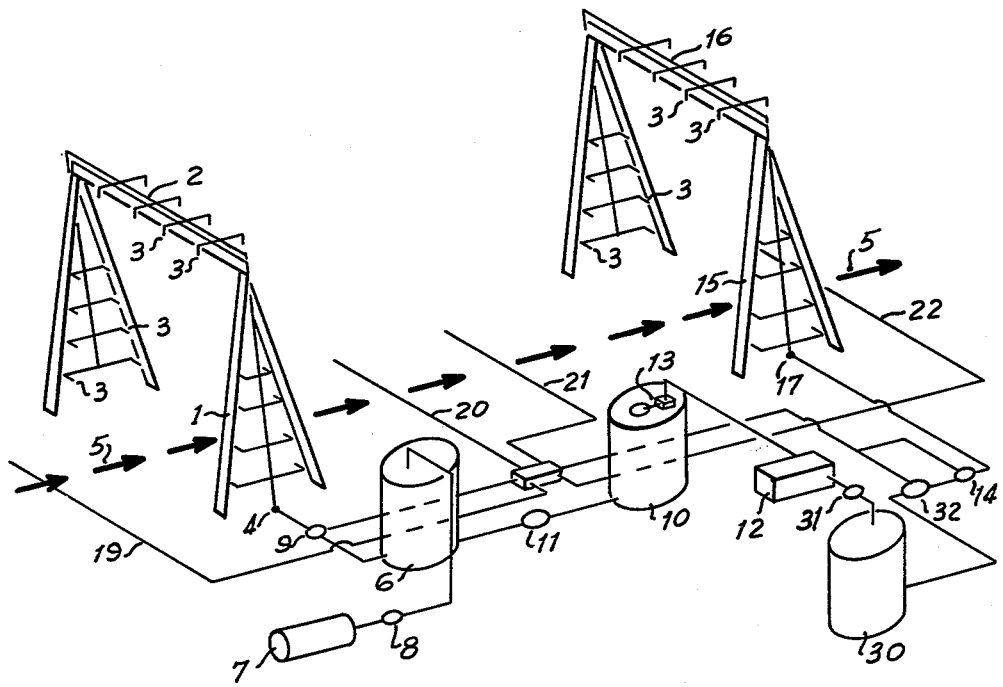
FIGURE 2 shows a pictorial view of another form of the present invention.

Referring now to FIGURE 2, there is depicted another form of the present invention which is suitable in those cases where the water supply 12 (which is normally the municipal water supply) is incapable of delivering water at a satisfactory pressure. Thus, in FIGURE 2 there is shown a third tank, hereinafter referred to as the reservoir tank 30, which may be an open-top, vat-type tank similar to the mixing tank 10, and also having a single outlet. The reservoir tank 30 receives water from the water supply 12 by way of a control valve 31 which may be a float-type valve similar to the float cutoff valve 13. Water is provided from the reservoir tank 30 to the second spray manifold 16 by way of pressuring means 32 (which may be a pump) and the control valve 14 shown in FIGURE 1. The entire system shown in FIGURE 2 is energized and operated in the same manner as is the system shown in FIGURE 1. However, it should be noted that the pressuring means 32 may be actuated by the same signal from the master control box 18 which actuates and de-actuates the control valve 14.

Figure 3:
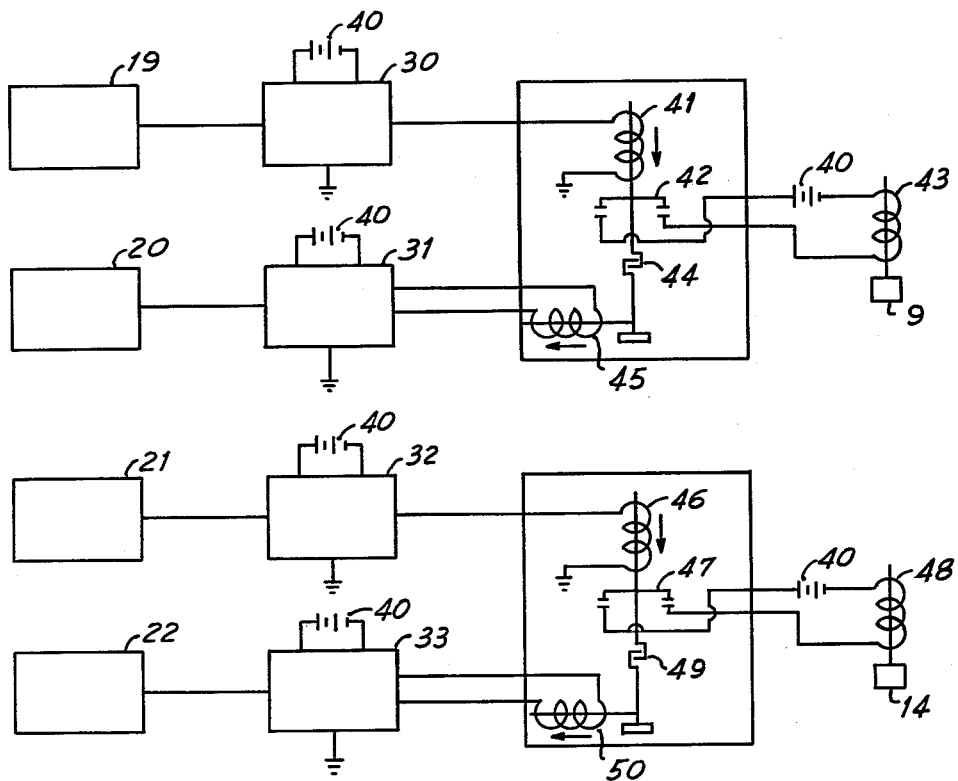
FIGURE 3 depicts a schematic diagram of one form of the actuating and control mechanism used in the present invention.

Referring now to FIGURE 3, there is shown a detailed schematic view of one form of the components and circuitry contained in the master control box 18 appearing in FIGURE 1 and FIGURE 2. The first actuator 19, which is preferably a flexible tube or hose having one closed end, is disposed across the path 5 (see FIGURE 1 and FIGURE 2) in a manner such that the air inside the first actuator 19 is compressed by the weight of a passing vehicle. The open end of the first actuator 19 is connected to a first switch 30 which is preferably operated by being closed by the compression of the air inside the first actuator 19. This first switch 30, which may be a diaphragm-type of switch, is hereinafter referred to as the first pressure switch 30. The second, third, and fourth actuators 20, 21, and 22, are preferably similar in form and function to the first actuator 19, and are connected respectively to second, third, and fourth pressure switches 31, 32, and 33, which are preferably similar in form and function to the first pressure switch 30. Thus, each of the aforementioned four actuators 19, 20, 21 and 22, when compressed by the weight of a passing vehicle, apply compressed air to the diaphragms in their respective pressure switches 30, 31, 32, and 33. Each pressure switch is thereby closed by the weight of the vehicle on its respective actuator, and is correspondingly opened by the removal of the vehicle from the actuator. Each diaphragm may be adapted so that all air pressure greater than a pre-determined amount will be exhausted to avoid diaphragm rupture.

As shown in FIGURE 3, when closed, the first pressure switch 30 connects a source of electric current 40 to the actuating solenoid 41 of a first relay 42. When closed, the first relay 42 passes electric current through the solenoid 43 of the first solenoid controlled valve 9 depicted in FIGURE 1 and FIGURE 2. As shown in FIGURE 3, the first relay 42 is preferably equipped with a latching device 44 in order that the first solenoid controlled valve 9 will remain open after the vehicle has moved past the first actuator 19, and the first pressure switch 30 has reopened to disconnect electric current from the actuating solenoid 41 of the first relay 42. However, in order to minimize consumption of detergent fluid from the pressure tank 6 shown in FIGURE 1 and FIGURE 2, it is preferable that the first solenoid controlled valve 9 be closed once the vehicle has moved past the first rack 1. Therefore, as depicted in FIGURE 3, the second actuator 20 and the second pressure switch 31 are interconnected to apply electric power to a second solenoid 45 on the first relay 42 to disengage the latching device 44. The first relay 42, which may be spring-loaded, thereupon opens to disconnect electric power from the solenoid 43 of the first solenoid controlled valve 9, which in turn is adapted to return to a normal closed position.

When the vehicle rolls over the third actuator 21, in approaching the second (rinse) rack 15 depicted in FIGURE 1 and FIGURE 2, the third pressure switch 32 is thereby caused to close to apply electric current to the first solenoid 46 of a second spring-loaded relay 47 in the master control box 18. In a manner similar to that described for the first relay 42, the second relay 47 is held closed by a latching device 49 and passes electric current to the actuating mechanism 48 of the second control valve 14 depicted in FIGURE 1 and FIGURE 2. Thus, the second relay 47 maintains the second control valve 14 in its open position after the vehicle has passed the third actuator 21 and until it reaches the fourth actuator 22. When the front wheels of the vehicle reach the fourth actuator 22, and the fourth pressure switch 33 is closed, electric current is applied to the second solenoid 50 of the second relay 47 to disengage the latching device 49, and current is thereby removed from the actuating mechanism 48 of the second control valve 14. Thus, the rinse cycle of the entire washing operation is terminated.

Figure 4:
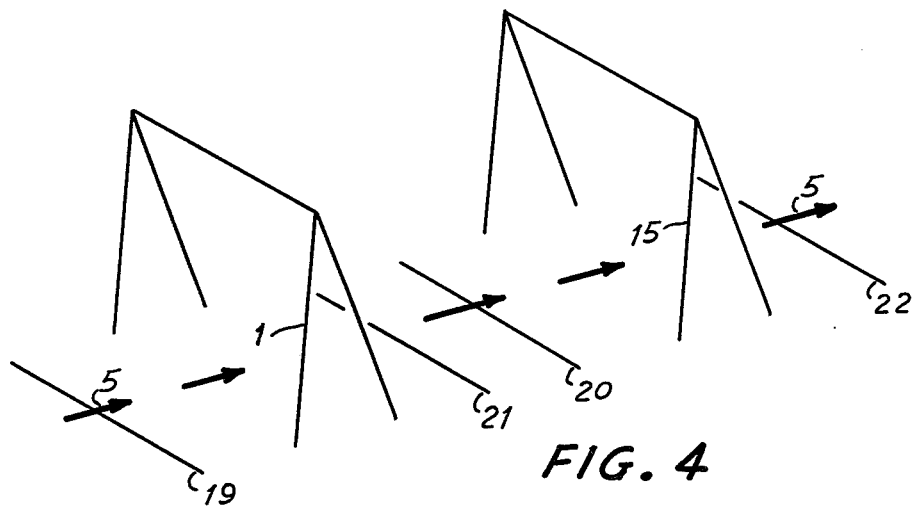
FIGURE 4 depicts a modified arrangement of the actuating mechanism used in the present invention.

In many cases, space limitations make it desirable that the first (wash) rack 1 and the second (rinse) rack 15 be positioned such that the intervening distance is less than the wheel base of the vehicle. Thus, it is often desirable that the positions of the four actuators 19, 20, 21 and 22, be rearranged so that the vehicle is thoroughly rinsed as well as washed. In FIGURE 4, the positions of the second and third actuators 20 and 21 in the vehicle path 5 have been reversed. Thus, even though the rear end of the vehicle may not have passed under the first rack 1 before the front end of the vehicle reaches the second rack 15, the front wheels of the vehicle will actuate the rinse cycle of the present invention.

Figure 5:
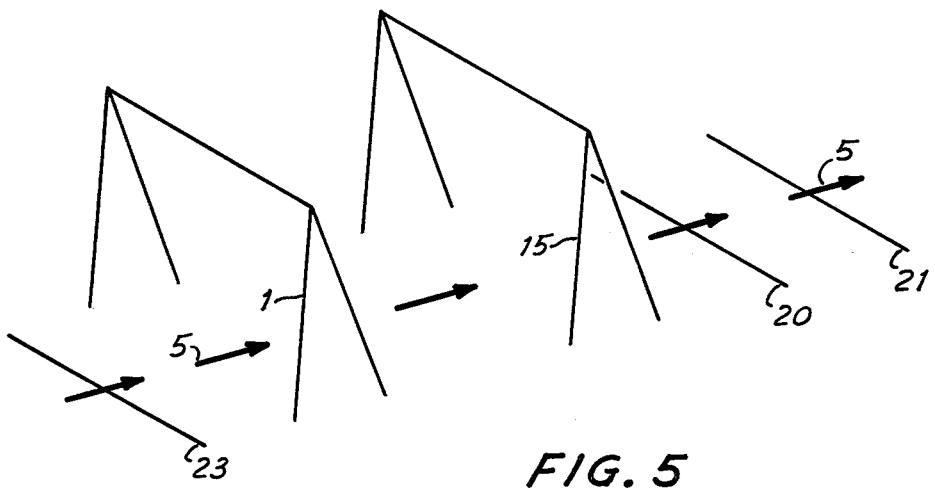
FIGURE 5 depicts another modified arrangement of the actuating mechanism used in the present invention.

In FIGURE 5, the first and second racks 1 and 15 are shown located very close together. Thus, the leading actuator 23 may actuate both the first and third pressure switches 30 and 32, and thereby simultaneously perform the functions of both the first and third actuators 19 and 21. In this form of the present invention, it may be suitable to arrange both the first spray manifold 2 and the second spray manifold 16 on a single rack.

Other modifications and variations of the present invention will be apparent from the foregoing, and the present invention is not to be limited to those forms depicted herein.

What is claimed is:

1. A system for cleaning the exterior surfaces of a self-propelled object progressing along a path, said system comprising a pressurized supply of water, a first container adapted to receive an amount of detergent agent connected to said supply for receiving therefrom a volume of water, a second container adapted to contain fluid under pressure, means for transferring fluid from said first container to said second container, means for applying a pressure to fluid in said second container, a first spray means straddling said path at a first location, a second spray means straddling said path at a second location, a first valve interconnecting said first spray means and said second container, a second valve interconnecting said second spray means and said supply of water, and pressure-responsive means actuated by said object progressing past said first and second locations for opening and closing said first and second valves.

2. A system for cleaning generally the top and sides of a motor vehicle progressing along a path, said system comprising a first means for receiving and spraying a liquid about said path at a first location, a second means for receiving and spraying a liquid about said path at a second location, a pressurized water supply, a container adapted to receive water soluble detergent, means connected to said water supply for transferring water to said container, a first valve interconnecting said container with said first means for spraying, a second valve interconnecting said water supply and said second means for spraying, and pressure-responsive means energized by the passage of said vehicle for opening and closing said first valve respectively upon the approach and departure of said vehicle to and from said first location and for opening and closing said second valve respectively upon the approach and departure of said vehicle to and from said second location.

3. A system for cleaning the exterior surfaces of a motor vehicle progressing along a path, said system comprising a first spray means adapted to receive and dispose a liquid across and about a first location in said path, a second spray means adapted to receive and dispose a liquid across and about a second location sequentially spaced in said path from said first location, a first container arranged and adapted to receive and contain water and water-soluble detergent, a second container adapted to receive and contain fluid under a pressure, means for providing water at a pressure, means interconnecting said means for providing water and said first container for disposing a pre-determined volume of water in said first container, means interconnecting said first container and said second container for transferring liquid from said first container to said second container, means for applying a pressure to the contents of said second container, a first gating means interconnecting said second spray means and said means for providing water at a pressure, a second gating means interconnecting said second container and said first spray means, a first pressure-responsive control means actuated by said vehicle for causing said second gating means to permit the flow of liquid from said second container to said first spray means and located in said path at a point adjacent said first spray means, a second pressure-responsive control means actuated by said vehicle for causing said second gating means to interrupt the flow of liquid from said second container to said first spray means and located in said path at a point sequential to said first spray means and adjacent said second spray means, a third pressure-responsive control means actuated by said vehicle for causing said first gating means to permit the flow of water from said water providing means to said second spray means and located in said path at a point sequential to said second control means and adjacent said second spray means, and a fourth pressure-responsive control means actuated by said vehicle for causing said first gating means to interrupt the flow of water from said water providing means to said second spray means and located in said path at a point sequential to said second spray means.

4. A system of the type described in claim 3 wherein said first control means, said second control means, said third control means, and said fourth control means are each actuated by the weight of said vehicle.

5. A system for cleaning the exterior surfaces of a motor vehicle progressing along a path, said system comprising a first spray means adapted to receive and dispose liquid across and about a first location in said path, a second spray means adapted to receive and dispose liquid across and about a second location sequentially spaced in said path from said first location, a first container arranged and adapted to receive water and water-soluble detergent, a second container adapted to contain fluid under a pressure, a supply of pressured water, means connected to said supply and mounted adjacent said first container for causing a pre-determined volume of water to pass from said supply into said first container, pumping means interconnecting said first and second containers for transferring amounts of said cleansing liquid to said second container, means for applying a pressure to the contents of said second container, a first gating means interconnecting said second spray means and said supply of pressured water, a second gating means interconnecting said second container and said first spray means, and control pressure-responsive means actuated by said vehicle for causing said first gating means to pass liquid to said first spray means during the travel of said vehicle past said first location and for causing said second gating means to pass liquid to said second spray means during the travel of said vehicle past said second location.

6. A system as described in claim 5 wherein said first and second gating means are both electrically operated, and wherein said control means comprises a source of electric current, a first latching relay having a normal open-circuit position when de-energized and arranged to connect said source to said second gating means when energized, a first switch adapted when closed to apply current from said source to said first relay in a manner to energize said first relay, a first actuating means disposed in said path preceding said first spray means and operable by the weight of said vehicle for closing said first switch, a second switch adapted when closed to apply current from said source to said first relay in a manner to unlatch said first relay, a second actuating means disposed in said path sequentially with respect to said first spray means and operable by the weight of said vehicle for closing said second switch, a second latching relay having a normal open-circuit position when de-energized and arranged to connect said source to said first gating means when energized, a third switch adapted when closed to apply current from said source to said second relay in a manner to energize said second relay, a third actuating means disposed in said path preceding said second spray means and operable by the weight of said vehicle for closing said third switch, a fourth switch adapted when closed to apply current from said source to said second relay in a manner to unlatch said second relay, and a fourth actuating means disposed in said path sequentially with respect to said second spray means and operable by the weight of said vehicle for closing said fourth switch.

References Cited in the file of this patent
UNITED STATES PATENTS

| | | |
|---|---|---|
| 2,558,472 | Wilcox | June 26, 1951 |
| 2,862,222 | Cockrell | Dec. 2, 1958 |